US009147292B2

(12) United States Patent
Terrier

(10) Patent No.: US 9,147,292 B2
(45) Date of Patent: Sep. 29, 2015

(54) RF-LINK MARGIN MEASUREMENT METHOD AND SYSTEM

(75) Inventor: Daniel Terrier, Toronto (CA)

(73) Assignee: KAPSCH TRAFFICCOM AG, Vienna (AT)

( * ) Notice: Subject to any disclaimer, the term of this patent is extended or adjusted under 35 U.S.C. 154(b) by 537 days.

(21) Appl. No.: 13/489,284

(22) Filed: Jun. 5, 2012

(65) Prior Publication Data

US 2013/0002407 A1 Jan. 3, 2013

(30) Foreign Application Priority Data

Jun. 28, 2011 (CA) ..................................... 2744625

(51) Int. Cl.

| | |
|---|---|
| ***H04Q 5/22*** | (2006.01) |
| ***G07B 15/06*** | (2011.01) |
| ***G07B 15/02*** | (2011.01) |
| ***G07B 15/00*** | (2011.01) |

(52) U.S. Cl.

CPC .............. *G07B 15/063* (2013.01); *G07B 15/00* (2013.01); *G07B 15/02* (2013.01)

(58) Field of Classification Search

CPC ....... G07B 15/063; G07B 15/02; G07B 15/00

See application file for complete search history.

(56) References Cited

U.S. PATENT DOCUMENTS

| | | | | |
|---|---|---|---|---|
| 6,219,613 | B1 | 4/2001 | Terrier et al. | |
| 6,486,769 | B1 * | 11/2002 | McLean | 340/10.32 |
| 8,872,633 | B2 * | 10/2014 | Stewart et al. | 340/10.3 |
| 2001/0019307 | A1 * | 9/2001 | Sato et al. | 340/928 |
| 2006/0038658 | A1 * | 2/2006 | Jarvis et al. | 340/10.1 |
| 2007/0075839 | A1 | 4/2007 | Ho et al. | |
| 2007/0290802 | A1 * | 12/2007 | Batra et al. | 340/10.1 |
| 2009/0184847 | A1 * | 7/2009 | Kohli et al. | 340/989 |
| 2010/0237998 | A1 | 9/2010 | Kohli et al. | |

OTHER PUBLICATIONS

Extended European Search Report for corresponding European Patent Application No. 12167424.6, dated Jul. 19, 2012, 7pp.

Office action for corresponding European Patent Application No. 12167424.6 dated Oct. 11, 2012, 7pp.

* cited by examiner

*Primary Examiner* — Benjamin C Lee

*Assistant Examiner* — Rajsheed Black-Childress

(74) *Attorney, Agent, or Firm* — Fiala & Weaver P.L.L.C.

(57) ABSTRACT

A system and method for conducting dynamic RF-link margin tests in an electronic toll collection for non-stationary vehicles travelling up to highway speed. The system maintains a list of candidate transponders and, during the course of a normal toll collection, if a transponder is on the list then the system schedules a margin test for a later handshake in the capture zone. At a location at or near the peak margin test the system conducts a margin test during one or more of the reader-transponder handshakes. The attenuation may be dynamically controlled by the system using a variable attenuator in the RF path from the reader RF module to the antenna. Distributing the margin measurement over multiple passes of a vehicle through the capture zone provides for a highway speed method of measuring link margin.

29 Claims, 7 Drawing Sheets

RF-LINK MARGIN MEASUREMENT METHOD AND SYSTEM

CROSS-REFERENCE TO RELATED APPLICATION(S)

This application claims priority to Canadian Patent Application No. 2,744,625, filed on Jun. 28, 2011, the contents of which are hereby expressly incorporated by reference.

FIELD OF THE INVENTION

The present application relates to electronic toll collection (ETC) systems and, in particular, to a method and system for measuring RF-link margin in an ETC system.

BACKGROUND OF THE INVENTION

In Electronic Toll Collection (ETC) systems, Automatic Vehicle Identification (AVI) is achieved by the use of Radio Frequency (RF) communications between roadside readers and transponders within vehicles. Each reader emits a coded identification signal, and when a transponder enters into communication range and detects the reader, the transponder sends a response signal. The response signal contains transponder identification information, including a unique transponder ID. In the United States, current AVI RF communication systems are licensed under the category of Location and Monitoring Systems (LMS) through the provisions of the Code of Federal Regulations (CFR) Title 47 Part 90 Subpart M.

Current ETC systems can be classed as either lane-based or open-road. In a lane-based system, vehicles are laterally constrained by physical means, such as barriers between lanes, so as to prevent a vehicle from changing lanes while in the communication zone. The reader controls reader channels, each of which corresponds to RF coverage of an individual vehicle lane. In certain lane-based systems the capture zone is typically designed to be less than one car length in length, for example, approximately 2.4 meters (8 ft long) and 3 meters (10 feet) wide. Thus, when a vehicle with a transponder passes through a capture zone, the vehicle location is associated with the specific lane at that instant in time, and the short length of the zone allows for accurate timing alignment with the vehicle detection imaging systems.

In contrast, open-road systems allow traffic to free flow without impediment of lane barriers. Although many open-road systems have capture zones similar in size to those used in lane-based systems, the vehicles are not constrained to a particular lane. For example, they can be mid-way between two lanes, and need not be traveling parallel to the lanes. For example, a vehicle may be changing lanes as it passes through the toll area.

Furthermore, open-road systems may employ more channels than lanes to provide overlapping or staggered RF capture zones over multiple lanes. The reader analyses detections from multiple capture zones to determine to which zone to assign the vehicle location. This is sometimes referred to as a "voting" algorithm, since the capture zone that receives the most responses from a transponder indicates the corresponding vehicle's likely location. An example of such an ETC system is described in a commonly owned U.S. Pat. No. 6,219,613.

When an ETC system is first installed, whether it be lane based or open-road, RF-link margin tests are performed as part of what is referred to as a "lane tuning" process. Lane tuning aims to calibrate the RF power transmitted by the each antenna controlled by the reader. The RF link margin reflects the amount of additional RF attenuation that can be tolerated between the reader and a given transponder before communications become unreliable. In an ETC system, a balanced RF margin is desired for optimal performance. A too high RF margin may cause undesired "cross-lane" reads whereby a transponder is triggered in an adjacent lane, which may affect the localization accuracy. On the other hand, an RF margin that is too low results in unreliable and possibly no communication with some vehicle/transponder combinations. Therefore, a balanced RF margin is sought when first installing an ETC system.

Lane tuning typically includes the generation of a static RF margin map, whereby the RF margin is determined at multiple points within the capture zone. The RF margin can be determined by the use of a physical variable attenuator, or digitally controlled variable attenuator, whereby attenuation is increased up to the point at which communication between a reader antenna and a transponder mounted in a stationary vehicle ceases. If the ETC system is downlink limited (when there is greater transponder to reader uplink margin versus reader to transponder downlink margin), as is assumed in the following description, a common attenuator that applies to both transmit and receive paths measures the downlink margin. Lane tuning may also involve determining a dynamic peak RF margin, whereby the maximum RF margin is recorded as a vehicle drives through a capture zone multiple times. The process requires an operator to be on-site with a test vehicle and a reference transponder, and requires the lane under test to be closed to traffic.

Over time, the RF margin can change (it typically decreases due to component degradation, weather, or other factors), which negatively impacts the communications link between the reader and transponder. One option is to periodically re-test the lane tuning by repeating all or part of the activities performed when a lane is initially commissioned. For example, a dynamic margin test can be re-performed; however, this requires that the corresponding lane be closed to traffic for the duration of the test, which under current procedures can take hours to complete.

Some ETC systems may employ Received Signal Strength Indication (RSSI) in the receiver block of a reader RF module in order to estimate RF link margin. The present invention describes a method which is not dependent on measuring received signal strength at the reader.

It would be advantageous to provide for improved processes and systems for RF-link margin testing in an ETC system, especially one suited to vehicles travelling at highway speeds.

BRIEF DESCRIPTION OF THE DRAWINGS

Reference will now be made, by way of example, to the accompanying drawings which show embodiments of the present invention, and in which.

SUMMARY

In one aspect, the present application describes a method of testing RF margin in an electronic toll collection system having a capture zone. The method includes detecting a transponder within the capture zone by receiving a response signal from the transponder that includes a transponder identifier; determining that the transponder is a candidate transponder by comparing the transponder identifier to a set of stored identifiers of candidate transponders for margin testing; conducting a margin test while the transponder is within the capture zone; and storing a test result from the margin test in association with the transponder identifier.

In another aspect, the present invention describes an electronic toll collection system, including a reader and an antenna defining a capture zone in a roadway. The reader is configured to detect a transponder within the capture zone by receiving a response signal from the transponder that includes a transponder identifier; determine that the transponder is a candidate transponder by comparing the transponder identifier to a set of stored identifiers of candidate transponders for margin testing; conduct a margin test while the transponder is within the capture zone; and store a test result from the margin test in association with the transponder identifier.

Other aspects and features of the present invention will be apparent to those of ordinary skill in the art from a review of the following detailed description when considered in conjunction with the drawings.

DETAIL DESCRIPTION

Figure 1:
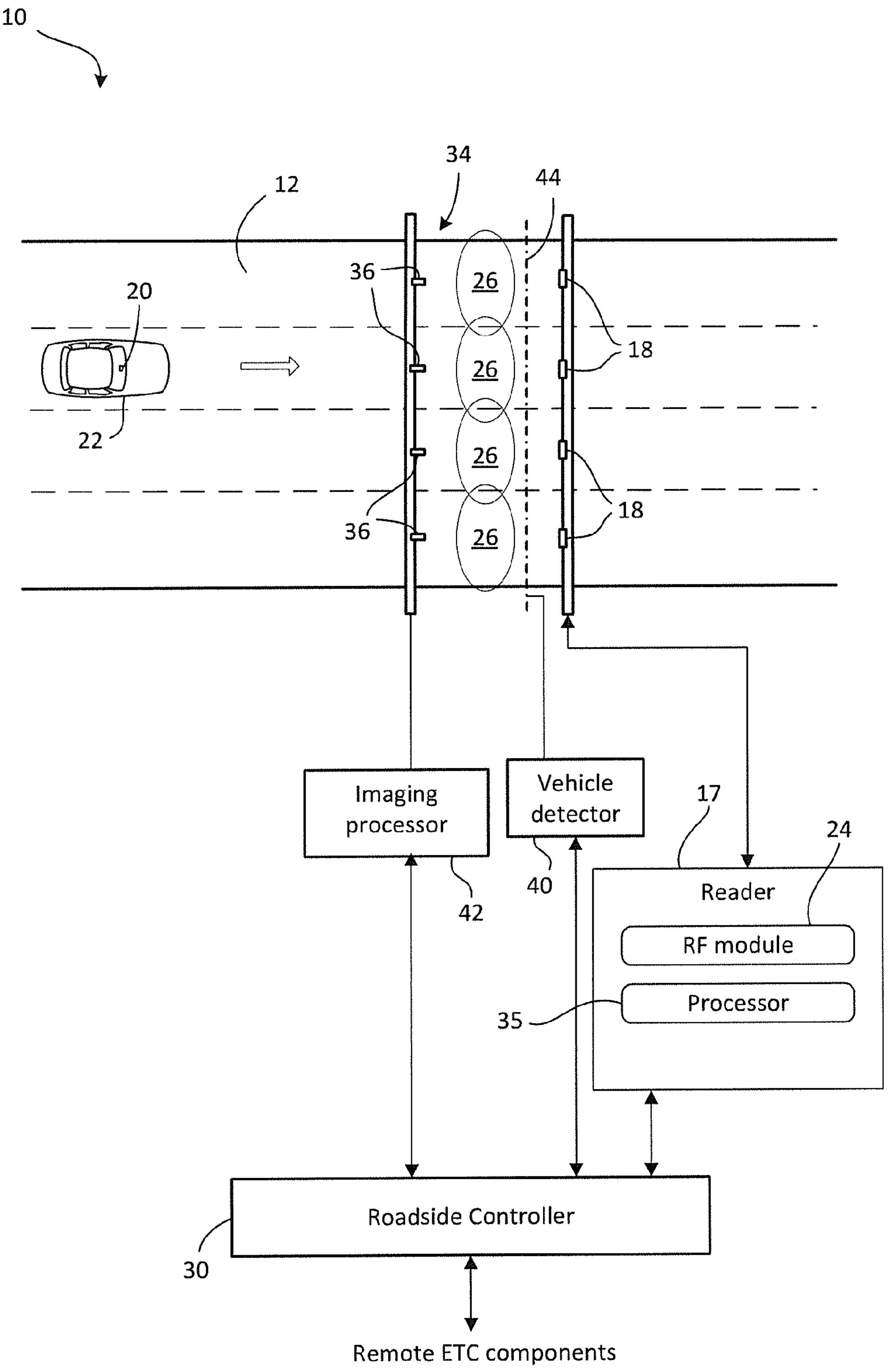
FIG. 1 is a block diagram for an exemplary electronic toll collection (ETC) system, according to some embodiments of the present invention.

Reference is first made to FIG. 1, which in a block diagram form shows an exemplary electronic toll collection (ETC) system 10, according to some embodiments of the present invention. The ETC system 10 is employed in connection with a roadway 12 having one or more lanes for vehicular traffic. The arrow in the roadway 12 indicates the direction of travel. For diagrammatic purposes, a vehicle 22 is illustrated in the roadway 12. In some instances, the roadway 12 may be an access roadway leading towards or away from a toll highway. In other instances, the roadway 12 may be the toll highway itself.

Vehicle 22 is shown in FIG. 1 with a transponder 20 mounted to the windshield. In other embodiments, the transponder 20 may be mounted in other locations. For example, it may be mounted on or near the license plate area of the front bumper area of the vehicle.

The ETC system 10 includes antennas 18 connected to an automatic vehicle identification (AVI) reader 17. The reader 17 generates signals for transmission by the antennas 18 and processes signals that are received by the antennas 18. The reader 17 includes a processor 35 and one or more RF modules 24 (one is shown for clarity). In some embodiments, each antenna 18 may have a dedicated RF module 24, while in other embodiments, an RF module 24 may be shared by more than one antenna 18 through for example, time multiplexing.

The antennas 18 are directional transmit and receive antennas, which in the illustrated embodiment, are oriented to define a series of capture zones 26 extending across the roadway 12 in an orthogonal direction. The arrangement of capture zones 26 define the communication zone within which toll transactions are conducted using an ETC communications protocol. Although FIG. 1 shows one antenna 18 centered in each lane of the roadway 12, in some embodiments, the ETC system 10 also includes antennas 18 between each of the lanes, that is, straddle antennas positioned approximately above the lane divisions to provide overlapping coverage with the mid-lane antennas.

In some embodiments, the ETC system 10 may operate, for example, within the industrial, scientific and medical (ISM) radio bands at 902-928 MHz. For example, the ETC system 10 may conduct communications at 915 MHz. In other embodiments, other bands/frequencies may be used, including 2.4 GHz, 5.9 GHz, etc.

The ETC system 10 may operate using active, passive, or semi-passive transponders. In general, an active transponder is battery powered and generates and transmits a response signal when it detects a trigger signal broadcast from one of the antennas 18. A passive transponder relies upon a continuous wave RF signal broadcast by one of the antennas 18 to wake-up the circuitry of the transponder. The passive transponder then uses backscatter modulation of the continuous wave RF signal to transmit a response signal to the antenna 18. A semi-passive transponder is similar to a passive transponder but, may include a battery to provide power for transponder functions not related to receiving and transmitting RF signals (for example to power user interface features such as indicator lights). In any case, the ETC system 10, and in particular the reader 17 and antennas 18, continuously poll the capture zones 26 using for example, time division multiplexing to avoid interference in overlapping capture zones 26. Polling may take the form of sending a trigger or polling signal and awaiting a response signal from any transponder that happens to be within the capture zone 26.

In the ETC system 10, vehicles are first detected when they enter the capture zones 26 and the vehicle-mounted transponder 20 responds to a trigger or polling signal broadcast by one of the antennas 18. The frequency of the polling is such that as the vehicle 22 traverses the capture zones 26, the transponder 20, receives and responds to trigger or polling signals from the reader 17 a number of times. Each of these polls-responses may be referred to as a "handshake" or "reader-transponder handshake" herein.

Once the reader 17 identifies the transponder 20 as a newly-arrived transponder 20, it may begin the process of an ETC toll transaction. An ETC toll transaction may include programming the transponder 20 through sending a programming signal that the transponder 20 uses to update the transponder information stored in memory on the transponder 20. The ETC toll transaction may further include debiting an account balance by a toll amount. In some embodiments, the ETC toll transaction also includes lane assignment, which typically occurs later in the capture zone after multiple handshakes have occurred. The ETC toll transaction may also include transmitting a transaction report from the reader 17 to a roadside controller 30.

The ETC system 10 further includes an enforcement system. The enforcement system may include a vehicle imaging system, indicated generally by the reference numeral 34. The vehicle imaging system 34 is configured to capture an image of a vehicle within the roadway 12 if the vehicle fails to complete a successful toll transaction. The vehicle imaging system 34 includes cameras 36 to capture the rear license plate of a vehicle in the roadway 12. A vehicle detector 40 defines a vehicle detection line 44 extending orthogonally across the roadway 12. The vehicle detector 40 may include a gantry supporting a vehicle detection and classification (VDAC) system to identify the physical presence of vehicle passing below the gantry and operationally classifying them as to a physical characteristic, for example height. In some embodiments, the vehicle detector 40 may include loop detectors within the roadway for detecting a passing vehicle. Other systems for detecting the presence of a vehicle in the roadway 12 may be employed.

The imaging processor 42 and vehicle detector 40 are connected to and interact with the roadside controller 30. The roadside controller 30 also communicates with remote ETC components or systems (not shown) for processing ETC toll transactions. The roadside controller 30 receives data, such as a transaction report, from the reader 17 regarding the transponder 20 and the presence of the vehicle 22 in the roadway 12, such as its lane assignment. The roadside controller 30 may perform aspects of the ETC toll transaction which, in some embodiments, may include communicating with remote systems or databases. Upon completing a toll transaction, the roadside controller 30 may instruct the reader 17 to communicate with a transponder 20 to indicate whether the toll transaction was successful. The transponder 20 may receive a programming signal from the reader 17 advising it of the success or failure of the toll transaction and causing it to update its memory contents. For example, the transponder 20 may be configured to store the time and location of its last toll payment or an account balance.

The roadside controller 30 further receives data from the vehicle detector 40 regarding vehicles detected at the vehicle detection line 44. The roadside controller 30 controls operation of the enforcement system by coordinating the detection of vehicles with the position of vehicles having successfully completed a toll transaction. For example, if a vehicle is detected in the roadway at the vehicle detection line 44 in a particular laneway, the roadside controller 30 evaluates whether it has communicated with a vehicle that has completed a successful toll transaction and whose position corresponds to the position of the detected vehicle. If not, then the roadside controller 30 causes the imaging processor 42 to capture an image of the detected vehicle's license plate.

It will be appreciated that the roadside controller 30 needs to have reasonably accurate information regarding the position of each of the vehicles in the roadway 12 for which it is conducting toll transactions. Without accurate and timely positional information regarding each of the vehicles, the roadside controller 30 is unable to correlate the position of those vehicles with vehicles detected by the vehicle detector 40.

As the vehicle nears the end of or leaves the capture zone 26, the reader 17 or roadside controller 30 determines the vehicle's position within the roadway 12. This allows the roadside controller 30 to coordinate detection of the vehicle by the vehicle detector 40 with known vehicles in the roadway. It may be noted that only one vehicle is present in a particular capture zone 26 at any one time in this embodiment.

In some cases, the vehicle position is determined based on a "voting" algorithm that counts the number of handshakes (read and responses) between the transponder 20 and each antenna 18. Based on the relative number of handshakes between the transponder 20 and the various antennas 18, the reader 17 or the roadside controller 30 is able to determine the likely position of the vehicle in the roadway 12. This is sometimes referred to as a "lane assignment".

Figure 2:
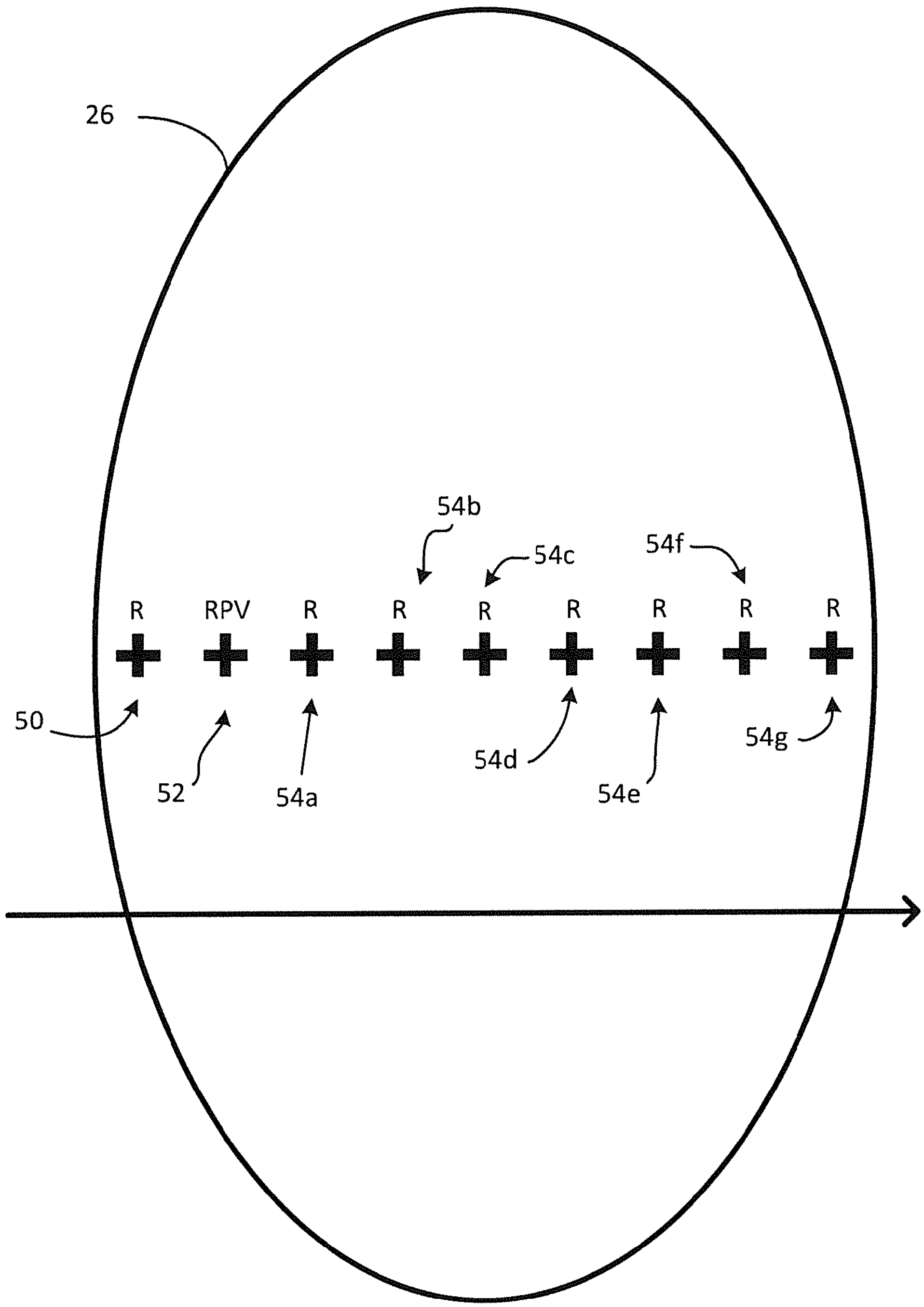
FIG. 2 diagrammatically illustrates a series of successful communication handshakes between a reader antenna and a vehicle mounted transponder within a capture zone, according to some embodiments of the present invention.

Reference is now made to FIG. 2, which diagrammatically illustrates a pattern of handshakes within a capture zone 26 for a transponder traveling at highway speed in an open road toll system, according to some embodiments of the present invention. Although the capture zone 26 in this embodiment is illustrated as an ellipse with the direction of travel along the major axis, it will be understood that the direction of travel may be different (e.g. along the minor axis as illustrated in FIG. 1.) Also, the actual shape of the capture zone 26 may vary and be non symmetrical based on variety of factors including antenna patterns of both the roadside antenna and the antenna within the transponder, transponder mounting locations, vehicle geometry, etc.

As shown in FIG. 2, the capture zone 26 illustrates the general area within which the antenna 18 (and, hence, the reader 17) is able to communicate with transponders under normal conditions. It is noted that when a transponder traveling at highway speed first enters the capture zone 26, there is an initial read, as indicated by reference numeral 50. The response signal sent by the transponder in reply to the trigger or polling signal contains the transponder identifier or ID. From this, the reader 17 is able to determine that this is a newly-detected transponder. The reader 17 may then go on to poll other capture zones 26 in its normal cycle. Meanwhile, the reader (or the roadside controller 30) may initiate conduct of the toll transaction for the newly-detected transponder.

When the reader 17 re-polls the present capture zone 26, the transponder again responds with a response signal, and the reader 17 (presuming it is ready to do so) may send a programming signal as part of the toll transaction. This programming signal causes the transponder to update its memory content, for example, time and toll plaza identification. The reader may also perform a "verify" operation in some embodiments, which is essentially a re-reading of transponder memory to determine whether the transponder successfully updated its memory in accordance with the programming signal. This may be referred to as a read-program-verify or RPV handshake. The RPV handshake is indicated by reference numeral 52. Although FIG. 2 illustrates this as occurring in a single handshake, in some embodiments, the verification may occur in a later handshake (i.e. a subsequent cycle through the antennas 18/capture zones 26). In some embodiments, the transponder programming (RPV) operation may be disabled, this is known as a "read-only" ETC system. In such a read-only ETC system, the reader does not attempt to modify the transponder's memory as it travels through the capture zone.

After the RPV operation occurs, the transponder continues to traverse the capture zone 26 at highway speed. Subsequence cycles of the reader 17 protocol results in the broadcast of trigger or polling signals in the capture zone 26, to which the transponder will respond with a response signal, as indicated by read handshakes 54*a* to 54*g*. Based on the transponder ID in the response signal, the reader 17 recognizes that this transponder has already conducted a successful RPV transaction so the reader does not initiate a further RPV transaction. Nevertheless, the reader tracks the number of responses received from this transponder in this capture zone 26 to perform lane assignment. Note that lane assignment may be performed by the reader 17 or the roadside controller 30. For the purposes of the present discussion, it is assumed that the reader 17 performs this function; however, it will be appreciated that this may be performed by the roadside controller 30 or even by a separate component.

Figure 3:
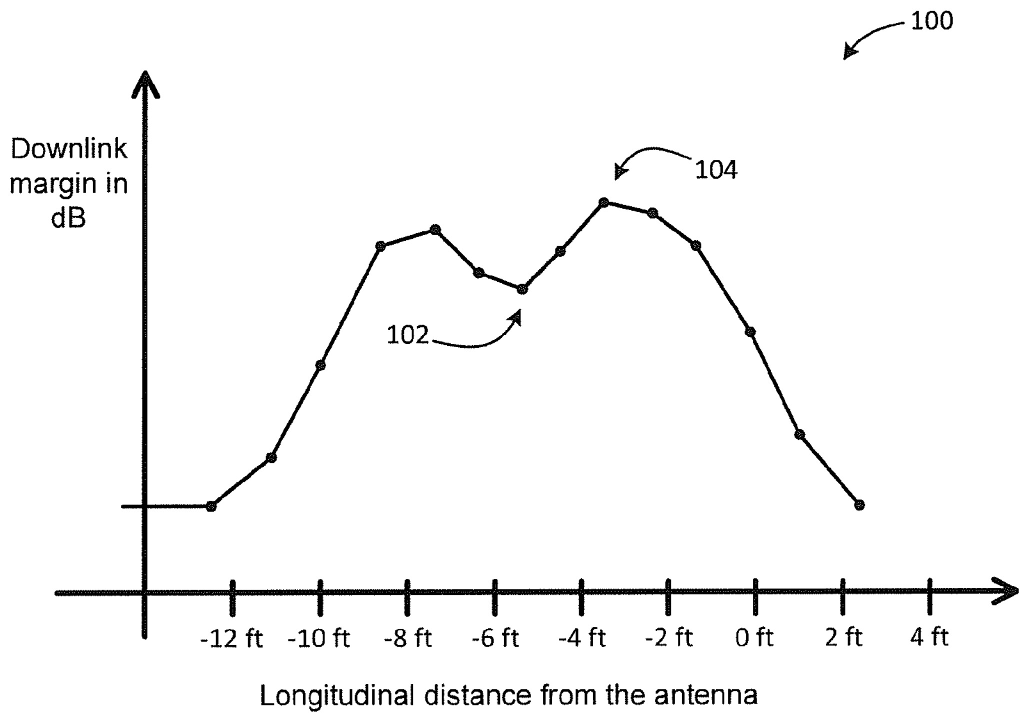
FIG. 3 shows an exemplary RF static map plot of a capture zone, showing available RF margin at selected distances from the reader antenna, according to some embodiments of the present invention.

Reference is now made to FIG. 3, which shows an exemplary plot 100 of RF-link margin measurements for an antenna in an ETC system, according to some embodiments of the present invention. The plot 100 illustrates the RF margin measurement, i.e., the amount by which the RF-link may be attenuated before failure-to-read. The x-axis indicates the longitudinal distance of the transponder from the antenna, ranging from the beginning of the capture zone at approximately 12 feet from the antenna to the end of the capture zone at approximately 2 feet past the antenna. The plot 100 gives a rough indication of the antenna pattern in terms of signal strength at the given distances from the antenna. In particular, the y-axis indicates the downlink margin in dB.

It is noted that in this example, the antenna is unable to detect a transponder, i.e., no margin, at more than 12 feet from the antenna. The direction of travel is along the x-axis. It also noted that there is a dip in the pattern, as indicated by reference numeral 102, at about 6 feet from the antenna. The peak 104 occurs about 4 feet from the antenna. The antenna loses margin after the peak and loses communication with the transponder entirely, at about 2 feet past the antenna.

When first installing the ETC system and configuring the antennas and reader, lane tuning is performed to confirm that the transmitted power at each antenna 18 is optimized for the particular environment. Too much transmitter power results in anomalies such as triggering a transponder earlier than desired (sometimes called a "skip read"), or triggering a transponder in an adjacent lane. Too low a transmitter power results in unreliable communication with certain vehicle and transponder combinations. Attenuation may then be inserted in the RF-link, such as between the reader 17 and antenna 18, to obtain a desired output power level. Generation of a RF static map then confirms the peak level and where the capture zone 26 begins and ends. In some embodiments, this may be set via a fixed attenuator external to the reader. In some embodiments, the fixed attenuation is set via a digitally controlled attenuator within the RF module 24 or within the reader 120. In some embodiments this may be a combination of both.

A static margin test normally conducted upon installation involves an operator positioning a test vehicle with a vehicle-mounted reference transponder at a known distance from the antenna. As the test vehicle is stationary, the lane must be closed to other traffic for safety reasons. An external variable attenuator is used to attenuate both the downlink and uplink RF signal. The reader interrogates the transponder, which responds if it detects the polling or trigger signals. Starting with high attenuation, the operator progressively decreases the level of external attenuation (while the reader repeats the polling operation) until the reader detects the response signal from the transponder. At this point, the level of the variable attenuator is noted and the attenuation value indicates the margin at that distance from the antenna, i.e., the amount by which the RF signal can be attenuated before communications fail. Multiple iterations may be performed to ensure accurate results. The vehicle is then advanced a short distance (for example by 1 ft.), and the above process repeated at each desired distance from the antenna until a plot, such as plot 100 in FIG. 3, is built up. Note that the RF margin varies according to the position of the vehicle within the capture zone. Sometimes, additional lateral vehicle positions are mapped, in addition to the center-line position where the vehicle travels directly beneath the antenna.

Conducting a margin test subsequent to installation is invasive, since it requires that a lane be closed to traffic for an extended period of time so that the above-described manual testing can be performed. At times, this become necessary since ETC components can degrade over time. A lane or antenna may be suspected of lower than design margin levels if certain anomalies are noted in the system.

In some embodiments, margin testing may be performed dynamically at highway speeds using real-time ETC data. In short, transponders mounted in customer vehicles travelling at up to highway speeds through an ETC capture zone are used to test margin in parallel with regular toll transaction, on an ongoing, periodic or continuous basis, instead of an operator closing a lane to perform a sporadic static or dynamic margin test. The ETC system accumulates a pool of candidate transponders that regularly use the particular reader-under-test. This pool of candidate transponders may be filtered to remove outliers. When a transponder enters the particular capture zone being tested, the reader recognizes it as a candidate transponder and, in addition to conducting a normal ETC toll transaction, it conducts a margin test.

The margin test may include applying a predetermined attenuation to the RF link and sending an attenuated polling signal to the candidate transponder during at least one of the handshakes. The reader notes whether the transponder responds to the attenuated polling signal and stores the test result. The amount of attenuation is varied over multiple passes through the particular capture zone being tested, so as to complete a margin test for that transponder. The reader may compute a moving average of link margin results from all candidate transponders that have completed test results for a particular capture zone. Should the average margin fall below a predetermined threshold, the reader may generate an alarm to the roadside controller.

The reader may also be configured to adjust the baseline attenuation level to attempt to maintain the average margin at the predetermined level. In other words, the reader may be configured to take corrective action if it determines that the average margin is below the predetermined threshold by decreasing a variable attenuator in the RF path. This may be done in addition to alerting the roadside controller or otherwise outputting an alarm or alert signal.

Figure 4:
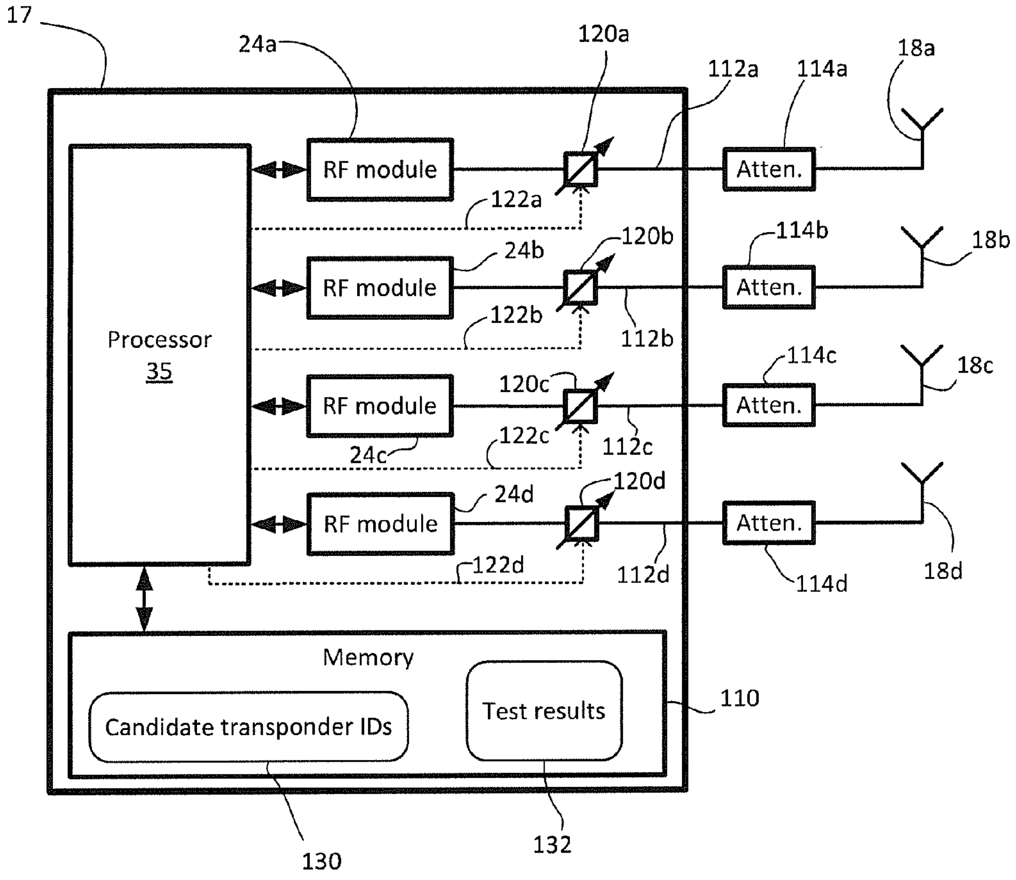
FIG. 4 is an exemplary block diagram of an ETC reader, according to some embodiments of the present invention.

Reference is now made to FIG. 4, which shows a block diagram of an ETC reader 17, according to some embodiments of the present invention. The ETC reader 17 includes the processor 35, a memory 110, and four RF modules 24 (shown individually as 24*a*, 24*b*, 24*c*, and 24*d*). Each RF module 24 is connected to a corresponding antenna 18 (shown individually as 18*a*, 18*b*, 18*c*, and 18*d*) by an RF link 112 (shown individually as 112*a*, 112*b*, 112*c*, 112*d*). The RF link 112 may include an RF cable, such as a coaxial cable or other cable capable of transferring RF-level signals without significant degradation, interference, cross-talk, etc.

It is noted that the RF-link 112 includes fixed attenuators 114 (shown individually as 114*a*, 114*b*, 114*c*, and 114*d*). The fixed attenuators 114 are selected and placed in the RF-link 112 to achieve a desired margin upon installation of the reader 17 and antennas 18. Although shown as a component separate from the reader 17, the attenuators 114 may, in some embodiments, be internal to the reader. In some embodiments, the attenuators 114 may be variable attenuators that have been set on installation with a selected attenuation value. In some embodiments, the attenuators 114 may be variable attenuators that have a value set by software. In these embodiments, the attenuators 114 may be internal to their respective RF modules 24.

The reader 17 further includes variable attenuators 120 (shown individually as 120*a*, 120*b*, 120*c*, and 120*d*). The variable attenuators 120 receive a control signal 122*a*, 122*b*, 122*c*, 122*d*, respectively, from the processor 35. The control signal 122 sets the attenuation level of its respective variable attenuator 120. In some embodiments, the variable attenuators 120 and attenuators 114 may be implemented using one variable attenuator for each RF link 112. In some embodiments, the variable attenuators 120 may be embedded within the RF module 24. Other mechanisms for implementing a dynamically controllable variable attenuator will be understood by those ordinarily skilled in the art in light of the present description.

The variable attenuators 120 each may have a baseline uplink and downlink attenuation setting, such that all RF module 24 transmissions (e.g. the poll signal) use the baseline downlink attenuation level, and all RF module receive operations (e.g. the transponder response) use a baseline uplink attenuation level.

The reader 17 is configured to perform dynamic margin testing by dynamically changing the attenuation (either uplink only, downlink only, or both simultaneously) applied to an RF-link 112 during at least one poll-response handshake with a transponder in the capture zone. The margin is dynamically tested by applying a variable attenuation using the variable attenuator 120 and then noting whether a response signal from the transponder is detected.

The memory 110 stores a list or collection of candidate transponder identifiers 130 and the test results 132.

Figure 5:
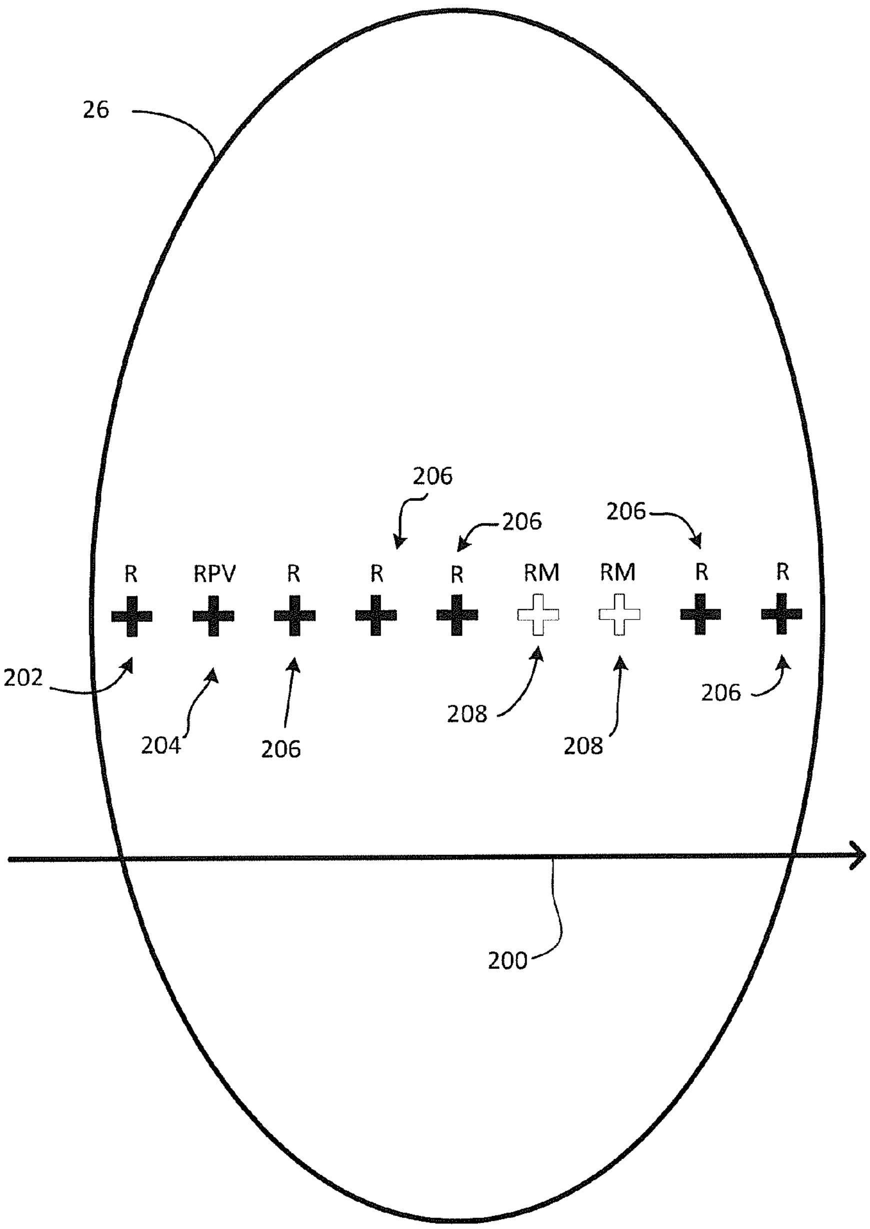
FIG. 5 shows communication handshakes for performing margin test samples, according to some embodiments of the present invention.

Reference will now be made to FIG. 5, which diagrammatically illustrates a pattern of handshakes within a capture zone 26 with a dynamic margin test, according to some embodiments of the present invention.

The vehicle-mounted transponder in this example is travelling through the capture zone 26 from left-to-right in the direction of arrow 200. It is noted that when the transponder first enters the capture zone, there is an initial read 202. During this initial read, the transponder responds to a detected polling signal from the reader by sending a response signal. The response signal contains at least a transponder ID number for the transponder.

Using the transponder ID number, the reader and/or roadside controller initiates a toll transaction. A subsequent handshake 204 (in this example, the next one) in this capture zone includes a read-program-verify (RPV) operation to update the transponder memory, as part of the toll transaction. An RPV operation may be repeated in a subsequent period if the reader determines that the RPV operation did not succeed.

The reader also uses the transponder ID number to determine whether this transponder is one of the candidate transponders for margin testing. The transponder ID number is compared to the stored list of candidate transponder IDs 130 (FIG. 4). If the transponder is determined to be a candidate transponder for margin testing, then the reader prepares to conduct a margin test during one or more subsequent handshakes in the capture zone as the transponder passes through. In some embodiments, the reader may retrieve stored test result data associated with the transponder ID number from its own memory or from memory in the roadside controller or elsewhere. The stored test result data may indicate previous margin test results and/or previous margin tests conducted. In some embodiments, the reader may perform a series of margin tests on the same transponder during multiple visits through the capture zone, wherein each margin test is conducted at a different attenuation level so as to identify the attenuation at which the test fails and, thus, the available RF-link margin.

The reader continues to execute periodic handshakes 206 with the transponder as it moves through the capture zone. As some point in the capture zone 26, at a distance that approximately corresponds to the expected RF peak location, the reader conducts one or more margin tests 208. When the vehicle is traveling at high speeds, there may be few reader-transponder communication handshakes within the entire capture zone (for example in one embodiment at 50 mph there may be only 10-15 communication handshakes). In this case, only a single handshake may be designated for a margin test during which the variable attenuator 120 (FIG. 4) is set to an attenuation level that is higher than the baseline for a given RF channel. When the vehicle is traveling at lower speed and where a greater number of reader-transponder communication handshakes are available, the reader may designate two or more handshakes for a margin test. The reader therefore may schedule a variable number of margin tests based on prevailing vehicle speeds.

Based on the foregoing description, it will be appreciated that the margin test involves adding a predetermined attenuation to the RF-link and sending a polling signal. The transponder sends a response signal if it detects the polling signal. In some embodiments, the test result is whether or not a response signal is received by the reader in reply to its attenuated polling signal. The test result is stored in memory in association with the attenuation level and the transponder ID number.

The determination of when to perform a margin test may be implemented in a number of ways. In many cases, the objective may be to perform a margin test when the transponder is estimated to be at the peak margin point, e.g., when the transponder is at a distance from the antenna corresponding to peak 104 shown in FIG. 3.

The assumed location of the peak margin point may be based upon the data collected from the initial measurement of margin on installation and calibration of the ETC system. The initial margin testing gives a distance from the antenna at which the peak occurs. However, in some embodiments, the estimate of peak location may be based upon average peak location for an antenna of that particular type for that type of installation.

The determination of when to test margin for a particular transponder may include estimating when that transponder is at the estimated peak margin location. To estimate where the transponder is located within the capture zone, the reader may rely upon a count of the number of handshakes. The number of handshakes that it takes for the transponder to traverse the capture zone of a pre-determined length gives an indication of travel speed through the zone. If the peak margin location is estimated to be at approximately 3 feet from the end of the zone in a zone 12 feet long (i.e., 75% of the way into the zone), then the transponder may be assumed to be at the peak margin location when it has executed three-quarters of the expected number handshakes. One or more handshakes at or near the three-quarter point may be designated for conducting a margin test.

The estimate of the vehicle location may be based upon vehicle speed. Recent counts of the number of handshakes while traversing a capture zone per vehicle, such as a moving average, for example, give an indication of the average vehicle speed at that time in the roadway. This may then be used to calculate an approximate time for a vehicle travelling at the average speed to reach the peak margin point. For example, the reader may determine that a vehicle travelling at the average speed will reach the peak margin point at about 50 ms after the first handshake occurs. On this basis, the reader may designate one of the handshakes as a margin testing handshake at around the 50 ms mark.

The vehicle speed can be determined via a number of other methods. The reader may be directly provided with vehicle speed from the roadside controller 30. The roadside controller 30 may receive external info ration regarding the vehicle speed. In some embodiments, the ETC system 10 may include a timing component that measures and/or estimates vehicle speed. In some embodiments, third party information, such as from a highway operator or transportation authority may provide input average vehicle speed information. In some embodiments, as noted above, the reader may estimate vehicle speeds in a specific capture zone by computing a moving average of the handshake counts of the most recent vehicles passing through a specific capture zone. In some embodiments, the reader may calculate the moving average across multiple capture zones, although the reader may assess whether particular capture zones have average that deviate significantly, which may indicate a vehicle speed problem particular to that lane.

From the vehicle speed, the reader can compute the expected total travel time in the capture zone (as its length can be pre-determined), and the expected handshake count. For example, if the expected capture zone transit time is 100 ms and the polling transmission from a given RF module occurs every 10 ms, the reader can expect 10 communication handshakes with the transponder. The reader can therefore estimate location based on elapsed time or handshake count. In the prior example, the reader can estimate the location of the transponder to be half-way into the capture zone when 50 ms has elapsed from the initial communication with the transponder, or after 5 polling transmissions have occurred.

In some embodiments, a relative location of the peak margin may be determined by capturing the received signal strength (RSSI) in the receiver block of the RF module 24 in association with the handshake count of a specific candidate transponder. For example, if the reader accumulates 10 handshake counts for a specific passage of a candidate transponder, and the peak RSSI is found at the $8^{th}$ handshake, the peak margin location can be dynamically determined to be located at 80% into the capture zone. This margin window location can then be stored in the reader's memory, and override the initial pre-determined peak margin location determined via the static lane tuning process. Note that in these embodiments, RSSI is not used to measure the margin, but rather to estimate the timing of the measurement.

In some embodiments, the number of handshakes to traverse the zone and, thus, the number of handshakes to reach the peak margin point, is partly based upon the specific average calculated for the particular transponder. That is, the reader tracks an average number of handshakes and stores that number in association with the transponder ID. Thus, each transponder has its own average number of handshakes to traverse the zone and the reader can schedule a margin test based upon an estimate of when this particular transponder is likely to be at the peak margin point using the transponder-specific average number of handshakes.

In some embodiments, the transponder-specific average is used in conjunction with the moving average vehicle speed to determine a specific vehicle speed. For example, if the moving average speed is slower than usual, it may be an indicator of heavy traffic, which will cause all vehicles to travel at the slower rate. However, if the moving average speed is at or near a normal highway speed, it may indicate relatively free flowing traffic. In that case, an adjustment for a specific transponder may be made if the transponder-specific average number of handshakes indicates that the associated driver normally travels faster or slower than the prevailing speed.

In some embodiments, the margin testing may be performed over more than one handshake. That is, the handshakes falling within a particular window of the capture zone, for example 10% on either side of the peak margin point, may be designated as margin testing handshakes (e.g. reference 208 in FIG. 5).

Figure 6:
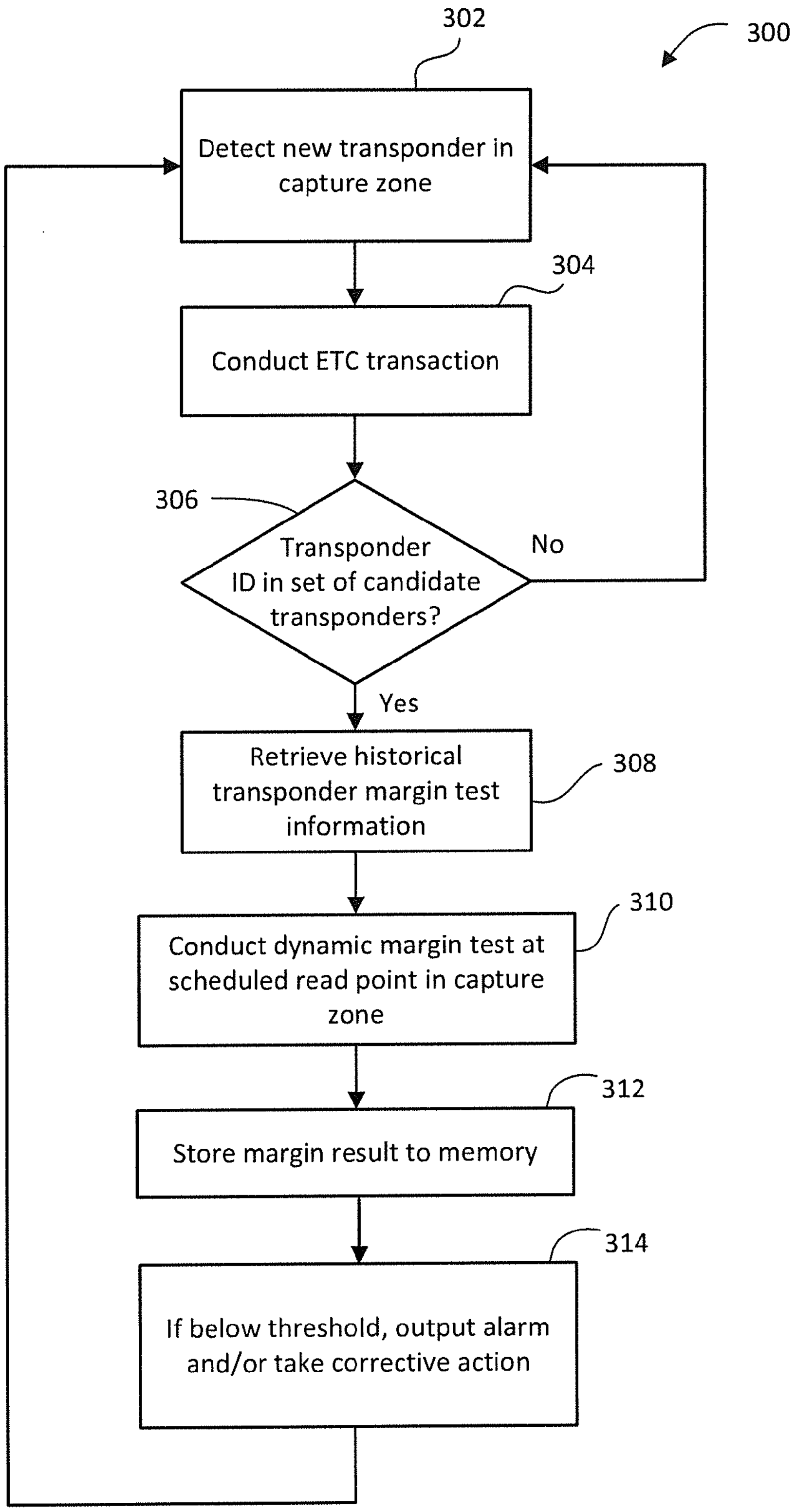
FIG. 6 is an exemplary process flow for performing a highway speed margin test, according to some embodiments of the present invention.

Reference is now made to FIG. 6, which shows an exemplary method 300 for performing a dynamic margin test, according to some embodiments of the present invention. The method 300 presumes that the reader has a list of candidate transponder IDs for margin testing stored in memory. Exemplary embodiments for generating that list are described further below. The method 300 begins with detection of a new transponder in the capture zone in operation 302. As described above the reader cyclically polls the capture zones. When a response signal is received by one of the antennas the response signal includes a transponder ID. Based on the transponder ID, the reader is able to determine whether this transponder has newly entered the capture zone.

As shown by operation 304, the reader conducts a normal ETC transaction with respect to the newly-detected transponder. The ETC transaction may include debiting an account associated with the transponder ID or other such transactions. A roadside reader, remote server, or other equipment may be involved in the ETC transaction processing. The ETC transaction may include programming the transponder with new data during a subsequent handshake. For example, the reader may program the transponder to store a transaction number, a last toll station ID, a time stamp, or other such data. The ETC transaction may also include determining lane assignment and providing a transaction report to a roadside reader. It will be appreciated that aspects of the ETC transaction may occur after some of the operations described below, i.e. later in the capture zone.

The reader also determines whether the newly-detected transponder is one of the candidate transponders for margin testing in operation 306. This operation may include comparing the received transponder ID with the candidate transponder IDs in the stored list of candidate transponders. If not, then the remainder of the ETC process continues as usual. For example, in some embodiments, the reader may count further handshakes for determining lane assignment in a 'voting' model for lane assignment.

If the transponder is a candidate transponder, then the method 300 continues to operation 308, whereupon the reader may retrieve transponder margin test information associated with the particular transponder ID and RF channel. This information includes the recent history of previous margin tests, including the attenuation level used during the test, and the result (communication successful or not successful). The reader uses the result from the previous margin test associated with the particular transponder ID and RF channel in order to determine the attenuation level for the next margin sample. If the last margin test was at attenuation level X dB, and the communication was previously successful at that level, the reader selects the next margin sample at a slightly higher attenuation level (for example X+1 dB). Note that variable attenuator 120 have different ranges and step sizes.

Some embodiments of variable attenuator 120 may have a 0 to 15 dB range with a step size of 1 dB. Higher ranges (for example 0 to 31 dB) and smaller step sizes (for example 0.5 dB) increase the number of samples required to obtain a result, but offer the benefit of higher resolution and greater margin measurement range. In some embodiments, the margin test involves the progressive adding of attenuation to the signal path to reduce the RF level and then the assessment of whether a response signal is received from the transponder. Accordingly, the retrieved transponder margin test information indicates the level of attenuation last tested and the result, if any. The information may be stored in memory within the reader, the roadside controller, or elsewhere. In some embodiments, the margin information is non-volatile such that information gathered over a period of time (e.g. days) is not lost due to power interruptions.

In operation 310, the reader conducts a margin test at a scheduled margin testing point. Per the above description, the scheduled margin testing point may be one or more handshakes selected based upon where the peak margin location is expected to be in the capture zone. Accordingly, it will be appreciated that a number of ordinary handshakes may take place between the initial detection of the transponder and the margin test. As noted above, the estimation of when the vehicle reaches the peak margin location may be based on average handshake counts, vehicle speed estimates, or other factors. In some embodiments, the reader estimates average vehicle speed or is provided a vehicle speed measurement or estimate from the roadside controller. From the vehicle speed, the reader can determine the expected number of handshake counts in the zone, or correspondingly, the total time for the transponder to travel through the capture zone.

The margin test that occurs in operation 310 includes adding a specified attenuation to the RF path between the RF module and the antenna. The attenuation may be added through configuring a dynamically adjustable variable attenuator. The variable attenuator may be a hardware component internal to the reader, such as variable attenuators 120 (FIG. 4), or may be external to the reader but operating under control of the reader. In either case, the variable attenuator has an attenuation level set dynamically by the reader and, specifically, the processor 35 (FIG. 4).

The amount of attenuation to be applied in any particular margin test may be specified in a schedule. The schedule may prescribe the levels of attenuation for the series of margin tests, in which progressively greater amounts of attenuation are applied until the transponder fails to respond. For example, one sample schedule may specify an initial test attenuation of 0 dB in the first margin communication handshake, a subsequent attenuation increase of 1 dB for each additional margin communication handshake, and a termination condition of one failed margin communication handshake. When the termination condition is reached the reader is in the position to generate an RF margin data point for a particular transponder in a particular capture zone. The schedule may be arranged based on the attenuation range and step size of the variable attenuators 120.

The stored transponder margin test information retrieved in operation 308 provides the most recent level of attenuation used and whether the test was successful or not, i.e., whether the transponder responded. In some embodiments, a failure to receive a response may be tested multiple times. When the transponder fails to respond; the reader may conclude that the RF link margin is the last level successfully tested amongst the test results 132. Over time, many results can be expected for a particular capture zone. The reader processor may compute a moving average of the recent results in order to provide an overall link margin level for an individual capture zone. In some cases, separate average results can be reported on according to known attributes of the transponder. For example, transponder attributes may include the specific model type of transponder, the mounting location of the transponder on the vehicle (e.g. windshield, front bumper), the vehicle class (e.g. truck, bus, sedan), etc.

The result of the margin test is then stored in memory 110 (FIG. 4) in association with the transponder ID, the capture zone identifier, and the level of the test attenuation in operation 312. The result may be stored as part of the transponder margin test information, i.e., the test results 132 (FIG. 4). In many embodiments the result is simply whether or not a response signal was received in reply to the attenuated reader polling signal.

The reader may be configured to use the average RF link margin results in order to trigger an alarm and/or corrective action when the average RF margin value decreases below a pre-configured minimum margin threshold. As shown in operation 314, such actions might include sending an alarm message to the roadside controller or to another remote device, and/or adjusting (i.e. reducing) the baseline attenuation level to maintain a pre-configured threshold.

It will be understood that the test attenuation may only be applied for the one or more handshakes that are designated or scheduled for use in margin testing. Other handshakes do not involve added attenuation, although it will be understood that the reader may have been calibrated to have a certain fixed amount of attenuation on installation and testing, such as fixed attenuators 114 (FIG. 4).

Figure 7:
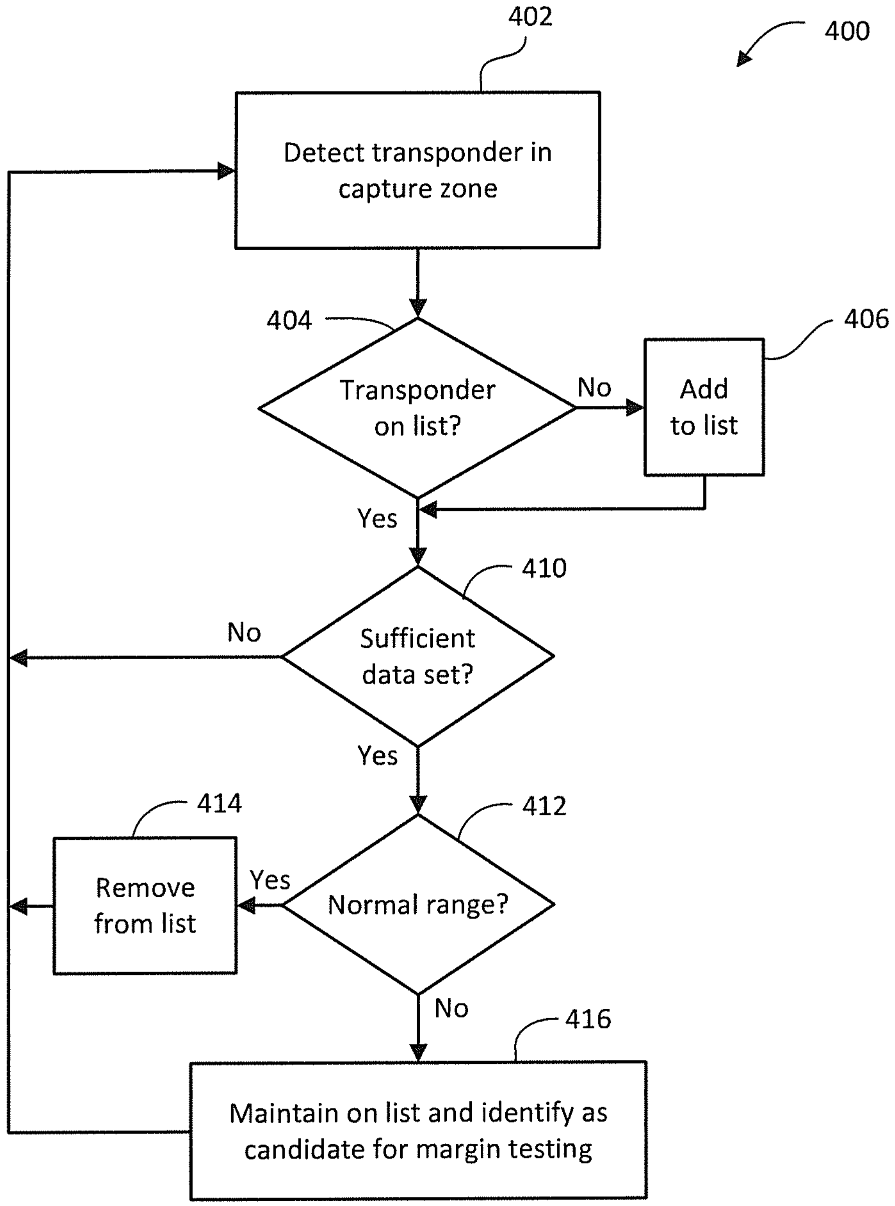
FIG. 7 is an exemplary process flow for generating a list of candidate transponders for margin testing, according to some embodiments of the present invention.

Reference will now be made to FIG. 7, which shows an exemplary method 400 for generating the list of candidate transponders for margin testing, according to some embodiments of the present invention. The method 400 may be implemented by a reader or a roadside controller. The method 400 is a process for building and refining a list of candidate transponders for margin testing. In general, the list may be populated by adding transponders that the reader detects passing through the toll area. Over time, as each individual transponder returns, the reader may evaluate whether the transponder is a suitable candidate for margin testing. Those that are suitable candidates may be left on the list and marked as candidate transponders, and those that are deemed unsuitable may be removed from the list, or marked as unsuitable. Various factors may influence whether a transponder is a suitable candidate for margin testing. For example, it may be preferable to have candidate transponders that return to the toll area repeatedly, such as a daily commuter.

The candidate transponders that have a handshake count that is close to the expected handshake count for the prevailing vehicle speed. The vehicle speed may be provided by the roadside controller. Alternately, an average vehicle speed can be determined by the reader by computing a rolling average of past total handshake counts through the capture zone, given that the approximate length of the capture zone is known. If the number of handshakes varies widely compared to the current expected average handshake count, it may indicate a poorly mounted transponder, or a transponder that the driver holds in his or her hand when passing through the toll collection area. A wide variation in handshake count is undesirable as it has negative impact on the reader's ability to estimate when the vehicle and transponder will reach the approximate peak margin location. Accordingly, these criteria and other similar criteria may be used to filter the list of transponders to arrive at a set of candidate transponders for margin testing.

The method 400 begins with detecting a new transponder in the area, as shown by operation 402. For the purposes of this example, it is presumed that the reader implements the method, although it is understood that the method 400 may be implemented by the roadside controller in some embodiments.

The reader evaluates whether the newly-detected transponder is on the list in operation 404. If not, then it is added to the list in operation 406. In either case, the reader stores data in association with the transponder in operation 408. The associated data may include number of handshakes completed by the transponder in the capture zone. This data may be stored in association with the date and time of the transponder's visit, and the transponder ID number.

In operation 410, the reader evaluates whether it has a sufficient data set to determine whether the transponder is a suitable candidate for margin testing. The size of the data set may be preset in the reader, for example, the reader may require 10 or more individual visits by the transponder to the toll area. In some embodiments, operation 410 may require a certain number of visits within a preset amount of time, such as 10-15 business days. If there is an insufficient data set to evaluate the transponder's suitability, then the method 400 returns to operation 402.

If there is a sufficient data set, then in operation 412 the reader assesses the transponder's suitability by determining whether the associated data falls within preset normal ranges. This determination may include determining the variability of the remaining readings of the number of handshakes. In some embodiments, this determination may involve excluding 1-2 outlier readings when assessing the variability of handshake counts. In some embodiments, other factors besides handshake count variability may be used to evaluate the suitability of the transponder. For example, the reader may compute an average capture zone handshake count or may have a preset average or normal handshake count, and a transponder whose particular handshake count deviates from the norm by more than a threshold amount may be deemed unsuitable. A large deviation may indicate a transponder that travels significantly faster or slower than the roadway average, or that is mounted or configured in such a way as to amplify or attenuate the RF signals outside of normal ranges.

In some embodiments, it may indicate a transponder with degraded or defective parts, such as a low battery, damaged components, etc.

If the transponder is determined to be unsuitable for margin testing in operation 412, then in operation 414 the transponder ID may be removed from the list or otherwise marked as unsuitable so that it does not get used during margin testing.

If the transponder is determined to be suitable, then in operation 416 the transponder ID may be identified or marked as a candidate transponder for margin testing. This may include setting a flag or other indicator in the list of transponders. In some cases, it may include maintaining a separate list of candidate transponders for margin testing and adding the transponder to that separate list.

Those skilled in the art will appreciated that the method 400 described above is one example method of building and filtering a list of candidate transponders for margin testing, and that the example method may be implemented using a variety of software programming techniques. It will be understood that various operations may be modified or re-ordered without materially changing the functioning of the method. It will also be appreciated that various additional operations may be added to the example method without materially changing its function.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of testing RF margin in an electronic toll collection system having a capture zone, the method comprising:

building a set of stored identifiers for candidate transponders that visit the capture zone multiple times;

detecting a transponder within the capture zone by receiving a response signal from the transponder that includes a transponder identifier;

determining that the transponder is a candidate transponder by comparing the transponder identifier to the set of stored identifiers for candidate transponders for margin testing;

if the transponder is a candidate transponder, conducting a margin test while the transponder is within the capture zone including sending a polling signal attenuated by a specified amount to the transponder, noting whether the transponder responds thereto, and storing a test result in association with said transponder identifier;

wherein the amount of attenuation is varied over at least two visits of the same transponder through the capture zone, so as to identify the attenuation at which a margin test fails, and, thus, the RF margin.

2. The method of claim 1, wherein the electronic toll collection system includes a reader and an antenna, and wherein conducting the margin test includes adding attenuation to an RF link between the reader and the antenna.

3. The method of claim 2, further comprising retrieving previous margin test information associated with the transponder identifier, wherein adding attenuation includes determining the attenuation level based upon the previous margin test information.

4. The method of claim 3, wherein the previous margin test information includes a last attenuation level during a most recent successful margin test, wherein determining the attenuation level includes increasing the last attenuation level by a step size.

5. The method of claim 2, wherein adding attenuation includes dynamically attenuating a polling signal in accordance with a predefined margin testing schedule.

6. The method of claim 1, wherein conducting the margin test includes scheduling the margin test for a selected reader-transponder handshake within the capture zone.

7. The method of claim 6, further comprising selecting the selected reader-transponder handshake based upon an estimated vehicle speed and a predetermined peak margin location.

8. The method of claim 7, further comprising determining the predetermined peak margin location based upon a previous transponder visit to the capture zone, wherein determining the predetermined peak margin location includes measuring received signal strength for each response signal for a series of response signals in the capture zone from the previous transponder; and identifying the peak margin location based upon the handshake corresponding to the strongest received signal strength measurement.

9. The method of claim 1, wherein detecting the transponder includes transmitting the polling signal in reply to which the response signal is received.

10. The method of claim 9, wherein storing the test result includes storing data indicating whether the reply is received.

11. The method of claim 10, wherein when the reply is not received and wherein, as a result, storing the test result includes storing a peak margin value based upon an attenuation level used in a most-recent successful margin test.

12. The method of claim 11, further comprising calculating an average RF margin for the capture zone based upon an average of stored peak margin values collected over a period of time.

13. The method claimed in claim 1, wherein building the set includes detecting transponders over a period of time and filtering out transponders that are detected less than a threshold number of times during the period of time.

14. The method claimed in claim 1, wherein building the set includes detecting transponders over a period of time and determining an average number of handshakes per visit, and filtering out a transponder with a handshake count more than a threshold amount different from the average number.

15. An electronic toll collection system, including a reader and an antenna defining a capture zone in a roadway, wherein the reader is configured to:

build a set of stored identifiers for candidate transponders that visit the capture zone multiple times;

detect a transponder within the capture zone by receiving a response signal from the transponder that includes a transponder identifier;

determine that the transponder is a candidate transponder by comparing the transponder identifier to a set of stored identifiers for candidate transponders for margin testing; and if the transponder is a candidate transponder, conduct a margin test while the transponder is within the capture zone including sending a polling signal attenuated by a specified amount to the transponder, noting whether the transponder responds thereto, and storing a test result in association with said transponder identifier;

wherein the reader is configured to vary the amount of attenuation over at least two visits of the same transponder through the capture zone so as to identify an attenuation level at which a margin test fails, and thereby determine an RF (radio frequency) link margin.

16. The system of claim 15, wherein the system further includes a variable attenuator in an RF link between the reader and the antenna, and wherein the reader is configured to conduct the margin test by adding attenuation using the variable attenuator.

17. The system of claim 16, wherein the reader includes a memory storing previous margin test information associated with the transponder identifier, and wherein the reader is configured to determine an attenuation level based upon the previous margin test information.

18. The system of claim 17, wherein the previous margin test information includes a last attenuation level during a most recent successful margin test, and wherein the reader is configured to determine the attenuation level by increasing the last attenuation level by a step size of the variable attenuator.

19. The system of claim 16, wherein the reader is further configured to add attenuation to attenuate a polling signal in accordance with a predefined margin testing schedule.

20. The system of claim 15, wherein the reader is further configured to conduct the margin test by scheduling the margin test for a selected reader-transponder handshake within the capture zone.

21. The system of claim 20, wherein the reader is further configured to select the selected reader-transponder handshake based upon an estimated vehicle speed and a predetermined peak margin location.

22. The system of claim 21, wherein the reader is further configured to determine the predetermined peak margin location based upon a previous transponder visit to the capture zone, and wherein determining the predetermined peak margin location includes measuring received signal strength for each response signal for a series of response signals in the capture zone from the previous transponder, and identifying the peak margin location based upon the handshake corresponding to the strongest received signal strength measurement.

23. The system of claim 15, wherein the reader is further configured to detect the transponder by transmitting a polling signal in reply to which the response signal is received, and wherein the reader is further configured to conduct a margin test by transmitting an attenuated polling signal and determining whether a reply is received.

24. The system of claim 23, wherein the reader includes memory and the reader is further configured to store the test result by storing data in memory indicating whether the reply is received.

25. The system of claim 24, wherein when the reply is not received the reader is further configured to store a peak margin value based upon an attenuation level used in a most-recent successful margin test.

26. The system of claim 25, wherein the reader is further configured to calculated an average RF margin for the capture zone based upon an average of stored peak margin values collected over a period of time.

27. The system of claim 15, wherein the reader is further configured to generate the set of stored identifiers for candidate transponders.

28. The system of claim 27, wherein the reader is further configured to generate the set by detecting transponders over a period of time and filtering out transponders that are detected less than a threshold number of times during the period of time.

29. The system of claim 27, wherein the reader is further configured to generate the set by detecting transponders over a period of time, and counting an average number of handshakes per visit, and filtering out a transponder with a handshake count more than a threshold amount different from the average number.

* * * * *